(12) United States Patent
Israel et al.

(10) Patent No.: US 12,124,087 B2
(45) Date of Patent: *Oct. 22, 2024

(54) WIDEBAND SURFACE COUPLING

(71) Applicant: Teramount Ltd., Jerusalem (IL)

(72) Inventors: Abraham Israel, Jerusalem (IL); Hesham Taha, Jerusalem (IL)

(73) Assignee: Teramount Ltd., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/120,816

(22) Filed: Dec. 14, 2020

(65) Prior Publication Data

US 2021/0165165 A1 Jun. 3, 2021
US 2023/0037280 A9 Feb. 2, 2023

Related U.S. Application Data

(63) Continuation of application No. 16/386,859, filed on Apr. 17, 2019, now Pat. No. 10,866,363, which is a continuation-in-part of application No. 15/797,792, filed on Oct. 30, 2017, now Pat. No. 10,481,334, which is a continuation of application No. 14/878,591, filed on Oct. 8, 2015, now Pat. No. 9,804,334.

(60) Provisional application No. 62/659,376, filed on Apr. 18, 2018.

(51) Int. Cl.
*G02B 6/12* (2006.01)
*G02B 6/30* (2006.01)

(52) U.S. Cl.
CPC .................................. *G02B 6/305* (2013.01)

(58) Field of Classification Search
CPC . G02B 6/305; G02B 6/12; G02B 2006/12104
See application file for complete search history.

(56) References Cited

U.S. PATENT DOCUMENTS

| 4,744,618 A | 5/1988 | Mahlein |
| 4,763,977 A | 8/1988 | Kawasaki et al. |
| 5,627,931 A | 5/1997 | Ackley et al. |

(Continued)

FOREIGN PATENT DOCUMENTS

| CA | 1253377 A | 5/1989 |
| CN | 1387626 A | 12/2002 |

(Continued)

OTHER PUBLICATIONS

First Chinese Foreign Office Action for Chinese Application No. 201980025948.3, Chinese National Intellectual Property Administration (CNIPA), Beijing City, China, dated Nov. 15, 2021.

(Continued)

*Primary Examiner* — Jennifer Doan
(74) *Attorney, Agent, or Firm* — Banner & Witcoff, Ltd.

(57) ABSTRACT

A wideband photonic bump (WBB), including: a positive taper of a polymer waveguide configured to further expand a light beam from an inverse taper to match a fiber optical mode of an optical fiber; a curved mirror formed on a surface of the WBB configured to reflect a light beam from the optical fiber; and a tilted flat mirror configured to direct the reflected light beam to an external optical fiber, wherein the WBB is coupled on the surface of a photonic integrated circuit (PIC).

28 Claims, 6 Drawing Sheets

(56) References Cited

U.S. PATENT DOCUMENTS

| | | |
|---|---|---|
| 5,913,002 A | 6/1999 | Jiang |
| 5,939,782 A | 8/1999 | Malladi |
| 6,122,417 A | 9/2000 | Jayaraman et al. |
| 6,198,864 B1 | 3/2001 | Lemoff et al. |
| 6,253,009 B1 | 6/2001 | Lestra et al. |
| 6,271,970 B1 | 8/2001 | Wade |
| 6,423,956 B1 | 7/2002 | Mandella et al. |
| 6,571,039 B1 | 5/2003 | Al-hemyari et al. |
| 6,600,845 B1 | 7/2003 | Feldman et al. |
| 6,654,533 B1 | 11/2003 | Koteles et al. |
| 6,801,693 B1 | 10/2004 | Jacobowitz et al. |
| 6,832,031 B2 | 12/2004 | Smaglinski |
| 6,862,092 B1 | 3/2005 | Ibsen et al. |
| 6,888,988 B2 | 5/2005 | Vancoille et al. |
| 6,941,047 B2 | 9/2005 | Capewell et al. |
| 6,960,031 B2 | 11/2005 | McFarland et al. |
| 7,050,304 B2 | 5/2006 | Hsu et al. |
| 7,058,275 B2 | 6/2006 | Sezerman et al. |
| 7,104,703 B2 | 9/2006 | Nagasaka et al. |
| 7,139,448 B2 | 11/2006 | Jain et al. |
| 7,260,328 B2 | 8/2007 | Kropp |
| 7,288,756 B2 | 10/2007 | Sherrer et al. |
| 7,317,746 B2 | 1/2008 | Ericson et al. |
| 7,358,109 B2 | 4/2008 | Gallup et al. |
| 7,366,380 B1 | 4/2008 | Peterson et al. |
| 7,447,404 B2 | 11/2008 | Miller |
| 7,567,391 B1 | 7/2009 | Strauch, III et al. |
| 7,729,581 B2 | 6/2010 | Rolston et al. |
| 7,853,101 B2 | 12/2010 | Carothers |
| 7,970,041 B2 | 6/2011 | Arimoto et al. |
| 8,000,565 B2 | 8/2011 | Liu |
| 8,117,982 B2 | 2/2012 | Gruber et al. |
| 8,390,806 B1 | 3/2013 | Subramanian |
| 8,422,836 B2 | 4/2013 | Riester et al. |
| 8,471,467 B2 | 6/2013 | Boerner |
| 8,548,287 B2 | 10/2013 | Thacker et al. |
| 8,582,934 B2 | 11/2013 | Adler et al. |
| 8,803,269 B2 | 8/2014 | Shastri et al. |
| 8,834,146 B2 | 9/2014 | Saha et al. |
| 8,836,942 B2 | 9/2014 | Quan et al. |
| 8,929,693 B2 | 1/2015 | Shin et al. |
| 9,039,304 B2 | 5/2015 | Ko et al. |
| 9,099,581 B2 | 8/2015 | Na et al. |
| 9,285,554 B2 | 3/2016 | Doany et al. |
| 9,429,725 B2 | 8/2016 | Shao et al. |
| 9,442,255 B2 | 9/2016 | Pommer et al. |
| 9,496,248 B2 | 11/2016 | Lee et al. |
| 9,500,821 B2 | 11/2016 | Hochberg et al. |
| 9,563,028 B2 | 2/2017 | Contag |
| 9,698,564 B1 | 7/2017 | Shubin et al. |
| 9,703,041 B2 | 7/2017 | Smith et al. |
| 9,739,962 B2 | 8/2017 | Brenner et al. |
| 9,791,645 B2 | 10/2017 | Meadowcroft et al. |
| 9,804,334 B2 | 10/2017 | Israel et al. |
| 9,804,348 B2 | 10/2017 | Badihi et al. |
| 9,864,133 B2 | 1/2018 | Patel et al. |
| 9,874,688 B2 | 1/2018 | Doerr et al. |
| 9,946,028 B2 | 4/2018 | Chen et al. |
| 10,054,740 B2 | 8/2018 | Chetrit et al. |
| 10,069,279 B2 | 9/2018 | Malcolm et al. |
| 10,222,552 B2 | 3/2019 | Djordjevic et al. |
| 10,481,334 B2 | 11/2019 | Israel et al. |
| 10,502,905 B1 | 12/2019 | Mathai et al. |
| 10,641,953 B1 | 5/2020 | Vashishtha et al. |
| 10,746,934 B2 | 8/2020 | Patel et al. |
| 10,754,107 B2 | 8/2020 | Li et al. |
| 10,866,363 B2 * | 12/2020 | Israel .................. G02B 6/136 |
| 11,394,468 B2 | 7/2022 | Zhou et al. |
| 11,448,836 B2 | 9/2022 | Ji et al. |
| 11,585,991 B2 | 2/2023 | Israel et al. |
| 11,863,917 B2 | 1/2024 | Meister et al. |
| 2002/0079430 A1 | 6/2002 | Rossi |
| 2002/0118907 A1 | 8/2002 | Sugama et al. |
| 2002/0131180 A1 | 9/2002 | Goodman |
| 2002/0150320 A1 | 10/2002 | Kato |
| 2002/0164129 A1 | 11/2002 | Jackson |
| 2003/0002809 A1 | 1/2003 | Jian |
| 2003/0043157 A1 | 3/2003 | Miles |
| 2003/0044118 A1 | 3/2003 | Zhou et al. |
| 2003/0142896 A1 | 7/2003 | Kikuchi et al. |
| 2003/0222282 A1 | 12/2003 | Fjelstad et al. |
| 2004/0114869 A1 | 6/2004 | Fike et al. |
| 2004/0184704 A1 | 9/2004 | Bakir et al. |
| 2005/0025430 A1 | 2/2005 | Bhagavatula et al. |
| 2005/0162853 A1 | 7/2005 | Jain |
| 2005/0164131 A1 | 7/2005 | Yokouchi |
| 2005/0276613 A1 | 12/2005 | Welch et al. |
| 2006/0239605 A1 | 10/2006 | Palen et al. |
| 2006/0251360 A1 | 11/2006 | Lu et al. |
| 2006/0280402 A1 | 12/2006 | Xia et al. |
| 2006/0285797 A1 | 12/2006 | Little |
| 2007/0103682 A1 | 5/2007 | Yoo |
| 2007/0160321 A1 | 7/2007 | Wu et al. |
| 2007/0223540 A1 | 9/2007 | Sudmeyer et al. |
| 2009/0178096 A1 | 7/2009 | Menn et al. |
| 2009/0262346 A1 | 10/2009 | Egloff et al. |
| 2009/0297093 A1 | 12/2009 | Webster et al. |
| 2010/0002987 A1 | 1/2010 | Hata et al. |
| 2010/0086255 A1 | 4/2010 | Ishizaka |
| 2011/0032598 A1 | 2/2011 | Horikawa et al. |
| 2011/0091167 A1 | 4/2011 | Nishimura |
| 2011/0170825 A1 | 7/2011 | Spector et al. |
| 2011/0280573 A1 | 11/2011 | Collings et al. |
| 2011/0293281 A1 | 12/2011 | Sakurai |
| 2012/0002284 A1 | 1/2012 | McColloch et al. |
| 2012/0063721 A1 | 3/2012 | Chen |
| 2012/0280344 A1 | 11/2012 | Shastri et al. |
| 2013/0044977 A1 | 2/2013 | Amit |
| 2013/0109083 A1 | 5/2013 | Llobera Adan |
| 2013/0129281 A1 | 5/2013 | Son et al. |
| 2013/0156370 A1 | 6/2013 | Kim et al. |
| 2013/0182998 A1 | 7/2013 | Andry et al. |
| 2013/0216180 A1 | 8/2013 | Tan et al. |
| 2014/0023098 A1 | 1/2014 | Clarkson et al. |
| 2014/0064559 A1 | 3/2014 | Sugasawa et al. |
| 2014/0176958 A1 | 6/2014 | Flanders et al. |
| 2014/0203175 A1 | 7/2014 | Kobrinsky et al. |
| 2014/0226988 A1 | 8/2014 | Shao et al. |
| 2014/0294342 A1 | 10/2014 | Offrein et al. |
| 2014/0363165 A1 | 12/2014 | Panotopoulos et al. |
| 2015/0050019 A1* | 2/2015 | Sengupta ............ G02B 6/3845 398/44 |
| 2015/0124336 A1 | 5/2015 | Kaufman |
| 2015/0125110 A1 | 5/2015 | Anderson et al. |
| 2015/0155423 A1 | 6/2015 | Matsuoka et al. |
| 2016/0109659 A1 | 4/2016 | Jiang |
| 2016/0131848 A1 | 5/2016 | Svilans |
| 2016/0161686 A1 | 6/2016 | Li et al. |
| 2016/0195677 A1 | 7/2016 | Panotopoulos et al. |
| 2016/0225477 A1 | 8/2016 | Banine et al. |
| 2016/0246004 A1 | 8/2016 | Kachru et al. |
| 2016/0306117 A1 | 10/2016 | Middlebrook et al. |
| 2016/0377821 A1 | 12/2016 | Vallance et al. |
| 2017/0017042 A1 | 1/2017 | Menard et al. |
| 2017/0017043 A1 | 1/2017 | Menard et al. |
| 2017/0102503 A1 | 4/2017 | Israel et al. |
| 2017/0131469 A1 | 5/2017 | Kobrinsky et al. |
| 2017/0160481 A1 | 6/2017 | Ling et al. |
| 2017/0207600 A1 | 7/2017 | Klamkin et al. |
| 2017/0294760 A1* | 10/2017 | Shubin .................. H01S 5/0225 |
| 2018/0031791 A1 | 2/2018 | Israel et al. |
| 2018/0045891 A1 | 2/2018 | Israel et al. |
| 2018/0061691 A1 | 3/2018 | Jain et al. |
| 2018/0180829 A1 | 6/2018 | Gudeman |
| 2018/0217341 A1 | 8/2018 | Smith et al. |
| 2018/0259710 A1 | 9/2018 | Stabile et al. |
| 2018/0364426 A1 | 12/2018 | Have et al. |
| 2019/0146162 A1 | 5/2019 | Evans |
| 2019/0170937 A1 | 6/2019 | Menezo et al. |
| 2019/0265421 A1 | 8/2019 | Ji et al. |
| 2019/0324211 A1 | 10/2019 | Israel et al. |
| 2019/0339450 A1 | 11/2019 | Noriki et al. |
| 2020/0278508 A1 | 9/2020 | Israel et al. |
| 2020/0326491 A1 | 10/2020 | Psaila et al. |

(56) References Cited

U.S. PATENT DOCUMENTS

| | | |
|---|---|---|
| 2020/0357721 A1 | 11/2020 | Sankman et al. |
| 2021/0165165 A1 | 6/2021 | Israel et al. |
| 2021/0239920 A1 | 8/2021 | Vallance et al. |
| 2021/0263216 A1 | 8/2021 | Bishop et al. |
| 2021/0392419 A1 | 12/2021 | Meister et al. |
| 2022/0026649 A1 | 1/2022 | Vallance et al. |
| 2022/0390693 A1 | 12/2022 | Krähenbühl et al. |
| 2022/0404546 A1 | 12/2022 | Krichevsky et al. |
| 2023/0018654 A1 | 1/2023 | Winzer et al. |
| 2023/0021871 A1 | 1/2023 | Kuznia et al. |
| 2023/0030105 A1 | 2/2023 | Aalto |
| 2023/0043794 A1 | 2/2023 | Winzer et al. |
| 2023/0072926 A1 | 3/2023 | Morrison et al. |
| 2023/0077979 A1 | 3/2023 | Winzer |
| 2023/0079458 A1 | 3/2023 | Debergh et al. |
| 2023/0084003 A1 | 3/2023 | Taha et al. |
| 2023/0094780 A1 | 3/2023 | Testa et al. |
| 2023/0130045 A1 | 4/2023 | Taha et al. |

FOREIGN PATENT DOCUMENTS

| | | |
|---|---|---|
| CN | 104459890 A | 3/2015 |
| EP | 2639978 A1 | 9/2013 |
| EP | 3316012 A1 | 5/2018 |
| EP | 3495861 A1 | 6/2019 |
| EP | 3521879 A1 | 8/2019 |
| EP | 4102273 A1 | 12/2022 |
| JP | 6462596 B2 | 1/2019 |
| KR | 20050007459 A | 1/2005 |
| KR | 20170081265 A | 7/2017 |
| RU | 2438209 C1 | 12/2011 |
| RU | 2485688 C2 | 6/2013 |
| RU | 2577669 C2 | 3/2016 |
| WO | 2001067497 A1 | 9/2001 |
| WO | 2013048730 A1 | 4/2013 |
| WO | 2018067703 A1 | 4/2018 |
| WO | 2018140057 A1 | 8/2018 |

OTHER PUBLICATIONS

International Search Report and Written Opinion of International Searching Authority for PCT/US2019/027871, ISA/RU, Moscow, Russia, dated Aug. 22, 2019.
O'Brien, "Silicon Photonics Fiber Packaging Technology", Photonics Packaging Group, Tyndall National Institute, Cork, Ireland, Sep. 2012.
Barwicz, et al., "Assembly of Mechanically Compliant Interfaces Between Optical Fibers and Nanophotonic Chips", IEEE 64th Electronics Components and Technology Conference, Orlando, Fl., May 27-30, 2014.
Bogaerts, "Helios Lecture: Coupling Light to Silicon Photonic Circuits", Silicon Photonics—PhD Course prepared within FP7-224312 Helios Project, Ghent University-IMECGhent, Belgium, Nov. 2009.
Chrical Photonics., "Fiber Coupler Overview", Pinebrook, NJ, Jan. 2013.
Cunningham, et al., "Aligning Chips Face-to-Face for Dense Capacitive and Optical Communications", IEEE Transactions on Advanced Packaging, vol. 33, No. 2, May 2010.
Hou, et al., "Physics of Elliptical Reflectors at Large Reflection and Divergence Angles I: Their Design for Nano-Photonic Integrated Circuits and Application to Low-loss Low-crosstalk Waveguide Crossing", Northwestern University, Evanston, IL., Apr. 2012.
Kopp, et al., "Silicon Photonic Circuits: On-CMOS Integration, Fiber Optical Coupling, and Packaging", IEEE Journal of Selected Topics in Quantum Electronics, Aug. 2010.
Kurata, et al., "Prospect of Chip Scale Silicon Photonics Transceiver for High Density Multi-mode Wiring System", Photonics Electronics Technology Research Association (PETRA), Japan, 2015, pp. 1-7.
Nguyen, et al., "Silicon-based Highly-efficient Fiber-to-waveguide Coupler for High Index Contrast Systems", Applied Physics Letters, American Institute of Physics, downloaded Feb. 29, 2012, published online Feb. 24, 2006.
PCL Connections LLC, all rights reserved, "In-Line Coupling Element (ICE) for Bonded Grating Coupling to Silicon PICs", Columbus, OH., May 2013.
The International Search Report and the Written Opinion for PCT/US2016/038047, ISA/RU, Moscow, Russia, dated Oct. 13, 2016.
Zimmerman, "State of the Art and Trends in Silicon Photonics Packaging", Silicon Photonics Workshop, Technische Universitat Berlin, May 2011.
Foreign Office Action and Search Report for ROC (Taiwan) Patent Application No. 105121625 dated Sep. 5, 2017 from IPO (Intellectual Property Office) of Taiwan.
Camapa, CD-ROM, pp. 58, 59, 79, Russia, 2012.
The International Search Report and the Written Opinion for PCT/US2017/055146, ISA/RU, Moscow, Russia, dated Jan. 31, 2018.
The European Search Report for EP Application No. 16854021.9 dated Aug. 21, 2018, EPO, The Hague.
Notice of Deficiencies for EP Application No. 16854021.9 dated Jun. 24, 2019, EPO, Rijswijk, Netherlands.
The First Chinese Office Action for Chinese Patent Application No. 2016800557192, dated Aug. 22, 2019, China, CNIPA.
Second Chinese Foreign Office Action for Chinese Application No. 2019800259483, Chinese National Intellectual Property Administration (CNIPA), Beijing City, China, Dated: May 31, 2022.
International Search Report and Written Opinion of International Searching Authority for PCT/IB2021/062224, ISA/IL, Jerusalem, Israel, Dated: Mar. 17, 2022.
USCONEC. "13950, Ferrule, PRIZM®LT 12F MM" https://www.usconec.com/products/ferrule-prizm-lt-12f-mm.
USCONEC. "15214, Mechanical Optical Interface (MOI) 10+ Gbps, PRIZM® LightTurn®". https://www.usconec.com/products/mechanical-optical-interface-moi-10plus-gbps-prizm-lighttum.
USCONEC. "15215, PRIZM®LightTurn® Mini HOusing" https://www.usconec.com/products/prizm-lightturn-mini-housing.
USCONEC. "16349, Ferrule, PRIZM®LT 8F SM" https://www.usconcc.com/products/ferrule-prizm-lt-8f-sm.
USCONEC. "Product Catalog" pp. 69 and 70. https://www.usconec.com/umbraco/rhythm/protectedfilesapi/download?path=%2ffiles%2fLiterature%2fUS_Conec_Product_catalog.pdf.
USCONEC. Mechanical Optical Interface Customer Drawings. https://www.usconec.com/umbraco/rhythm/protectedfilesapi/download?path=%2ffiles%2fdrawings%2fC15214.pdf.
Noriki et al., "45-degree curved micro-mirror for vertical optical I/O of silicon photonics chip," Optics Express, vol. 27, No. 14, Dated: Jul. 8, 2019.
The International Search Report and the Written Opinion for PCT Application No. PCT/IL2022/051131, ISA/IL dated Jan. 12, 2023.
Miller, David "Self-aligning optics for integrated mode separation," Standfor University, IEEE 2015.
Francis, David G. "Laser Instrumentation in AEDC Test Facilities," Arnold Engineering Development Center, Dec. 1971.
McLaughlin, Dennis K. "Laser Doppler Velocmeter Measurements in a Turbulent Jet Exiting into a Cross Flow," Arnold Engineering Development Center, Jan. 1972.
The International Search Report and the Written Opinion for PCT Application No. PCT/IL2022/051360, ISA/IL dated Mar. 5, 2023.
The International Search Report and the Written Opinion for PCT Application No. PCT/IL2022/051358, ISA/IL dated Apr. 2, 2023.
Notice of Preliminary Rejection dated Jul. 19, 2023 for KR Application No. 10-2018-7007767.
Doerr et al. Silicon photonic integrated circuit for coupling to a ring-core multimode fiber for space-division mutliplexing. Bell Laboratories. ECOC Postdeadline Papers. 2011 OSA. (Year: 2011).
The International Search Report and the Written Opinion for PCT Application No. PCT/IL2023/051163, ISA/IL dated Jan. 11, 2024.

* cited by examiner

WIDEBAND SURFACE COUPLING

CROSS REFERENCE TO RELATED APPLICATIONS

This application is a continuation of U.S. patent application Ser. No. 16/386,859 filed on Apr. 17, 2019, now U.S. Pat. No. 10,866,363, which claims the benefit of U.S. Provisional Application No. 62/659,376 filed Apr. 18, 2018, both of the above-referenced applications are hereby incorporated herein by reference in their entireties; U.S. patent application Ser. No. 16/386,859 is also a continuation-in-part of U.S. patent application Ser. No. 15/797,792, filed on Oct. 30, 2017, now U.S. Pat. No. 10,481,334, which is a continuation of U.S. patent application Ser. No. 14/878,591, filed on Oct. 8, 2015, now U.S. Pat. No. 9,804,334, the contents of which are incorporated herein by reference in their entirety.

TECHNICAL FIELD

The present disclosure relates generally to optical waveguides, and more particularly to waveguide surface coupling.

BACKGROUND

Communications systems and datacenters are required to handle massive amounts of data at ever increasing speeds and ever decreasing costs. To meet these demands, optical fibers and optical integrated circuits (ICs), such as a photonic integrated circuit (PIC) or an integrated optical circuit (IOC), are used in tandem with high speed electronic ICs. A PIC is a device that integrates multiple photonic functions, similar to an electronic IC or radio frequency (RF) IC. PICs are typically fabricated using silicon, indium phosphide or silicon oxide ($SiO_2$), which allows for the integration of various optically active and passive functions on the same circuit.

The coupling of PICs to optical fibers or to laser modules is not as well advanced as the integration or coupling of electronic ICs. Specifically, the challenges facing optical connections are different and much more complex than connecting electronic ICs to, for example, electrical pads. Some difficulties are inherent signal losses due to wavelength dependency, Polarization dependency, and tight assembly tolerances of optical packaging.

A major challenge in the design and fabrication of PICs is maintaining efficient coupling between compact surface waveguides and external optic devices (e.g., a fiber or laser element). In particular, wideband surface coupling remains a challenge for waveguides of sub-micrometer dimensions made in high index contrast materials, such as semiconductors.

Figure 4A:
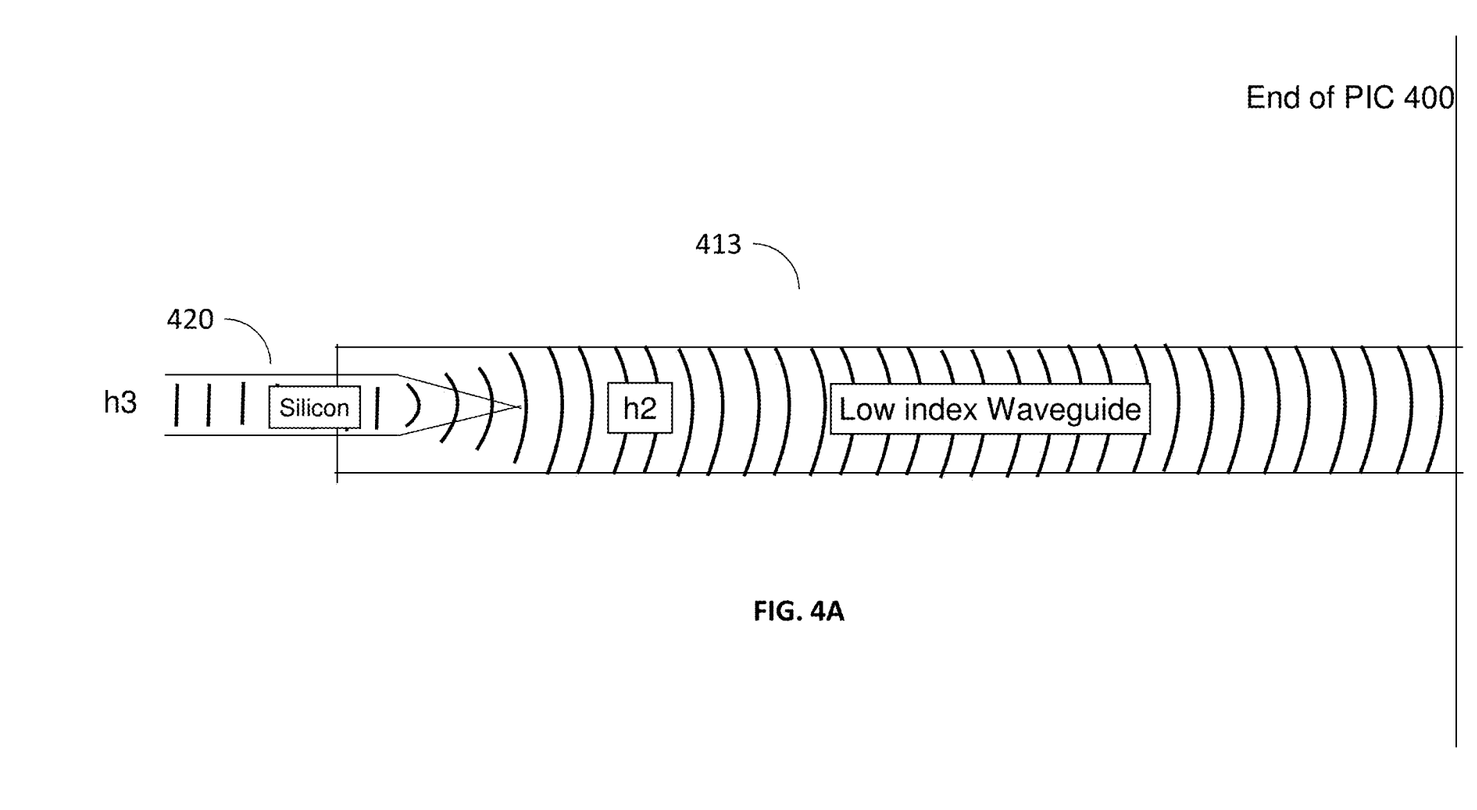
FIGS. 4A and 4B are a schematic diagram showing a side view and a top view of conventional WDM coupling.
Figure 4B:
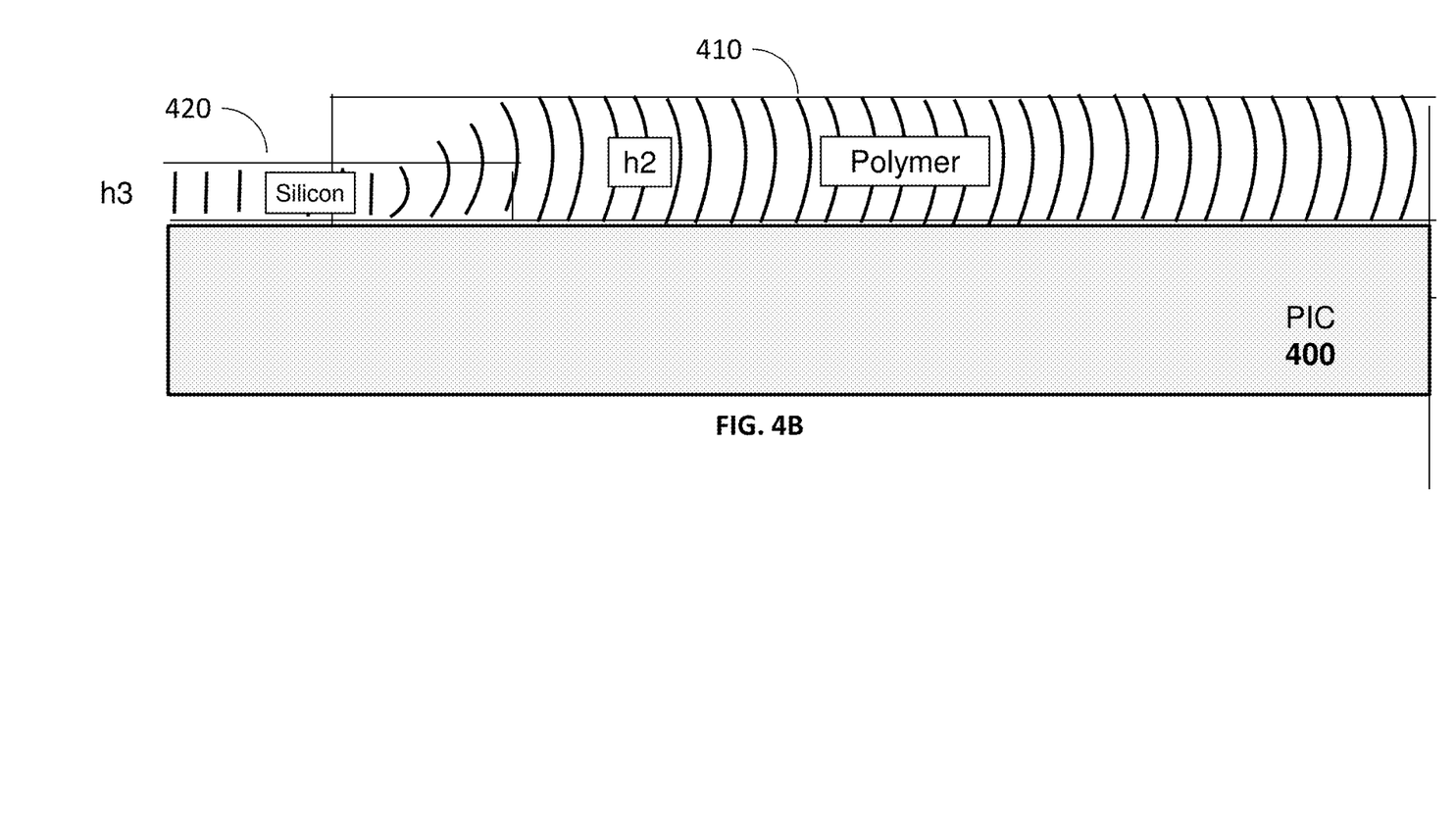

Current wideband optical coupling is performed at the end of the PIC, and therefore does not allow surface coupling. A conventional optical coupling is achieved using a low index of refraction waveguide being "wrapped" around the signal output on a PIC to expand the beam. A top-view and side-view of such a coupling is shown in FIG. 4A and FIG. 4B. As illustrated, the waveguide 410 is extended to the end of the PIC 400. The waveguide 410 expands the wavelength from the output 420 of less than 1 micron to approximately 3 to 5 microns.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a wideband photonic bump (WBB), including: a positive taper of a polymer waveguide configured to further expand a light beam from an inverse taper to match a fiber optical mode of an optical fiber; a curved mirror formed on a surface of the WBB configured to reflect a light beam from the optical fiber; and a tilted flat mirror configured to direct the reflected light beam to an external optical fiber, wherein the WBB is coupled on the surface of a photonic integrated circuit (PIC).

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments provide an optical module that allows wideband surface coupling between a photonic integrated circuit (PIC) (e.g., a photonic chip), and other optical elements (e.g., fibers and lasers), while ensuring low signal losses and thermal stability. The optical module is referred hereinafter as the WBB. Furthermore, the disclosed WBB achieves high signal efficiency with a relaxed alignment between the PIC and the optical element (fiber or laser).

To this end, the WBB performs the functions of mode conversion to allow connectivity to a single mode fiber and beam deflection. In an embodiment, the WBB further provides an optical interface to a photonic plug. The WBB disclosed herein can be fabricated by a lithography process, such as grayscale photolithography, nanoimprint lithography, and the like.

Figure 1:
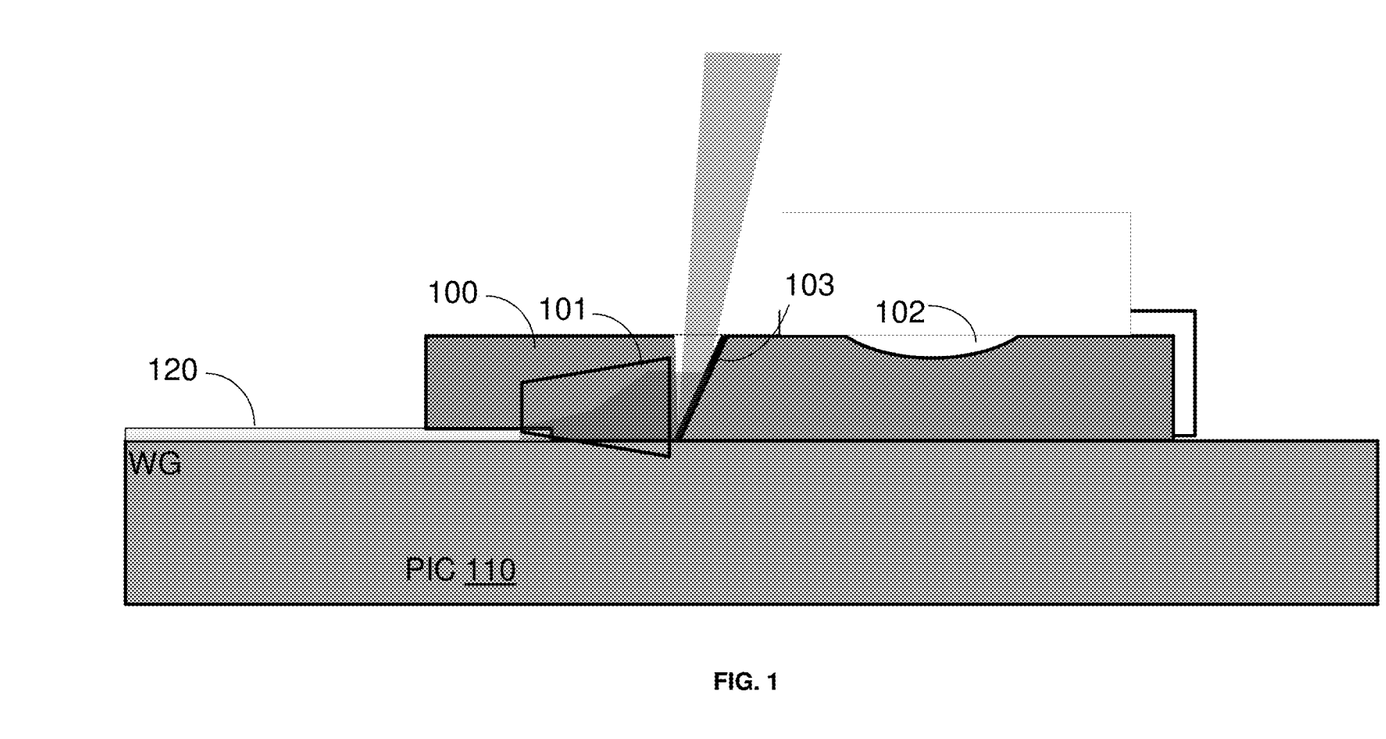
FIG. 1 is a schematic diagram showing a side view illustrating the placement of a Wideband photonic bump (WBB) on a PIC according to an embodiment.

FIG. 1 is a schematic diagram showing a side view illustrating the arrangement of the WBB 100 on a photonic integrated circuit (PIC) 110 according to an embodiment. The optical arrangement of the WBB 100 on the surface of the PIC 110 provides surface coupling. Specifically, the WBB 100 is optically connected to an inverse taper 120 of the PIC waveguide (hereinafter the "inverse taper" 120) and deflects a light beam from the inverse taper 120 to eventually reach, for example, a fiber (not shown in FIG. 1) while converting the light beam from a small waveguide mode to a large optical fiber mode.

In an embodiment, the inverse taper 120 is adiabatically narrowed down to allow the light beam to expand from a width of about less than 1 micron to about 3 or 4 microns at an endpoint of the waveguide.

The inverse taper 120 is part of the PIC 110, and thus is formed during the fabrication of the PIC 110. The optical fiber mode, on the other end, is typically 2-3 times larger (e.g., 10 microns) and an optical mode-matching element is required.

As schematically illustrated in FIG. 1, to allow a surface coupling, a light beam extracted from the PIC 110 is expanded, using two tapers, until the expanded light beam is deflected upwards.

According to an embodiment, the WBB 100 includes a positive taper of a polymer waveguide (hereinafter "positive taper 101"), a curved (collimated) mirror 102, and a tilted flat mirror 103. In certain embodiments, the positive taper 101 is structured and positioned post fabrication of the PIC 110. The positive taper 101 is utilized to further expand the light beam from the inverse taper 120 to match a fiber optical mode. From the positive taper 101, the light beam is deflected the flat mirror 103.

The tilted flat mirror 103 is utilized to direct the extended light beam to an external optical fiber (not show in FIG. 1) through an optical connection of a photonic plug. The optical paths of the beams deflected from the flat mirror 103 are discussed below. The light path allows for placement of the optical fiber parallel to the PIC 110.

In an embodiment, the tilted flat mirror 103 is tilted at a predefined angle. The angle is determined based on the optical path between the optical fiber and the curved mirror 102, e.g., an optical as demonstrated in FIG. 3 below. In an embodiment, the tilted flat mirror 103 is formed by using, for example, a nanoimprint lithography process that combines grayscale lithography to prepare the master for nanoimprint.

The curved mirror 102 is formed on the surface of the WBB 100 and is utilized to reflect a light beam from the photonic plug (both not shown in FIG. 1). In an embodiment, the curved mirror 102 can be formed on a substrate layer using a grayscale lithography process, a nanoimprint lithography process, and the like. In an embodiment, both the tilted mirror 103 and the curved mirror 102 are coated with dielectric layers that acts as a mirror (e.g., for specific wavelength, angle) to improve beam reflectivity.

The positive taper 101 performs an expansion of the light beams extracted from the PIC's 110 substrate though the inverse taper 120 to match an optical fiber mode. As noted above, the positive taper 101 can perform the mode matching (e.g., from 1 micron to 10 microns). According to an embodiment, the shape and material type of the positive taper 101 are selected to allow for such optical mode matching. In a further embodiment, the taper 101 is made of material having an index smaller than the refraction index of the inverse taper 120. In an embodiment, the taper 101 is shaped as shown in FIGS. 2A and 2B.

Figure 2A:
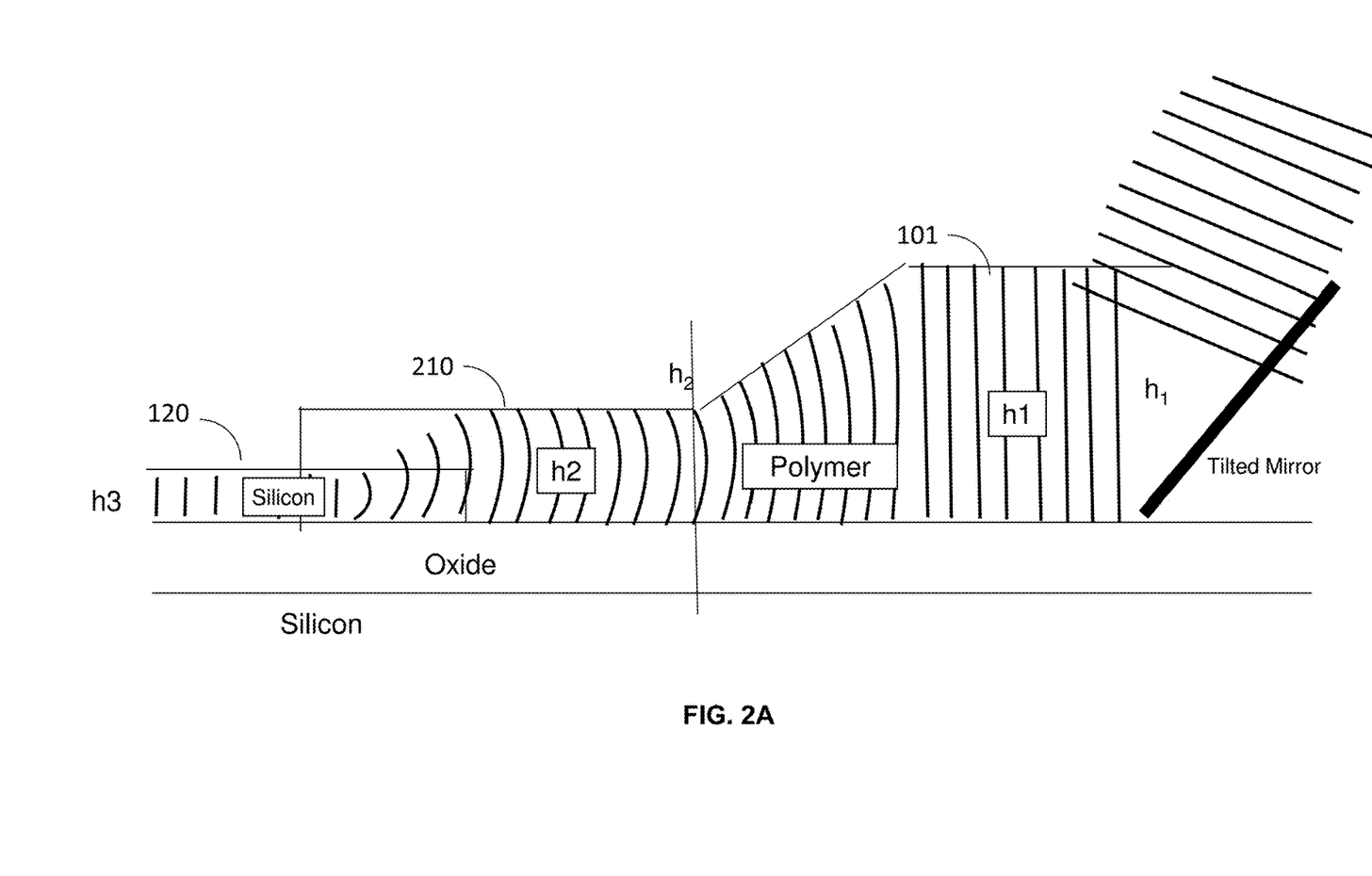
FIGS. 2A and 2B are schematic diagrams showing a side view and top view arrangement of the waveguide according to an embodiment.

FIG. 2A is a schematic diagram showing a side view of the arrangement of the inverse taper 120 and positive taper 101 according to an embodiment. The inverse taper 120 is fabricated on the PIC and is utilized to extract the light beams (optical signals) from the PIC's 110 substrate to a waveguide channel 210. The channel 210 is not tapered and is also made of a polymer and utilized to expand the extracted light beam, e.g., from less than 1 micron to 3-5 microns.

The positive taper 101 is designed to expand the light beam to an optical fiber mode, i.e., to adiabatically transform the extracted light beam to meet an optical mode of a fiber. In an example implementation, the height ($h_1$) at the end of the positive taper 101 is about 10-13 microns and the height ($h_2$) at the beginning of the waveguide channel is about 1-3 microns.

Figure 2B:
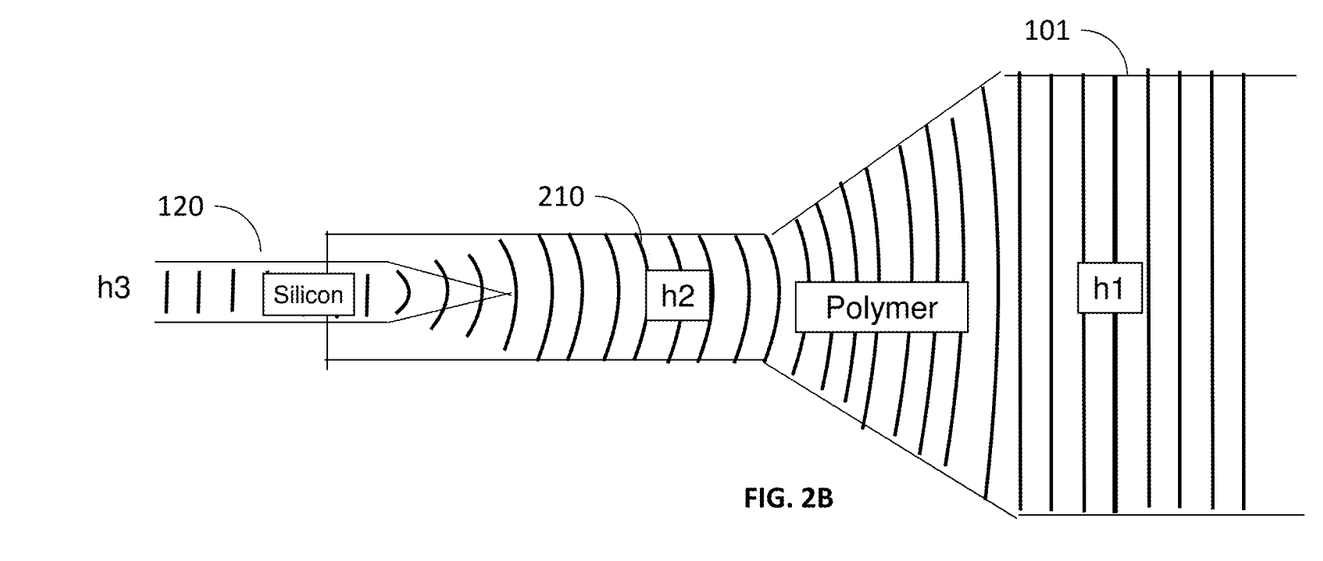

A top view of the arrangement of the inverse taper 120 and positive taper 101 is shown in FIG. 2B.

It should be noted that the WBB 100 allows for surface optical coupling of a PIC and an optical fiber. As the coupling is not performed at the edge of the die of the PIC, the disclosed WBB 100 allows for wafer level testing.

Figure 3:
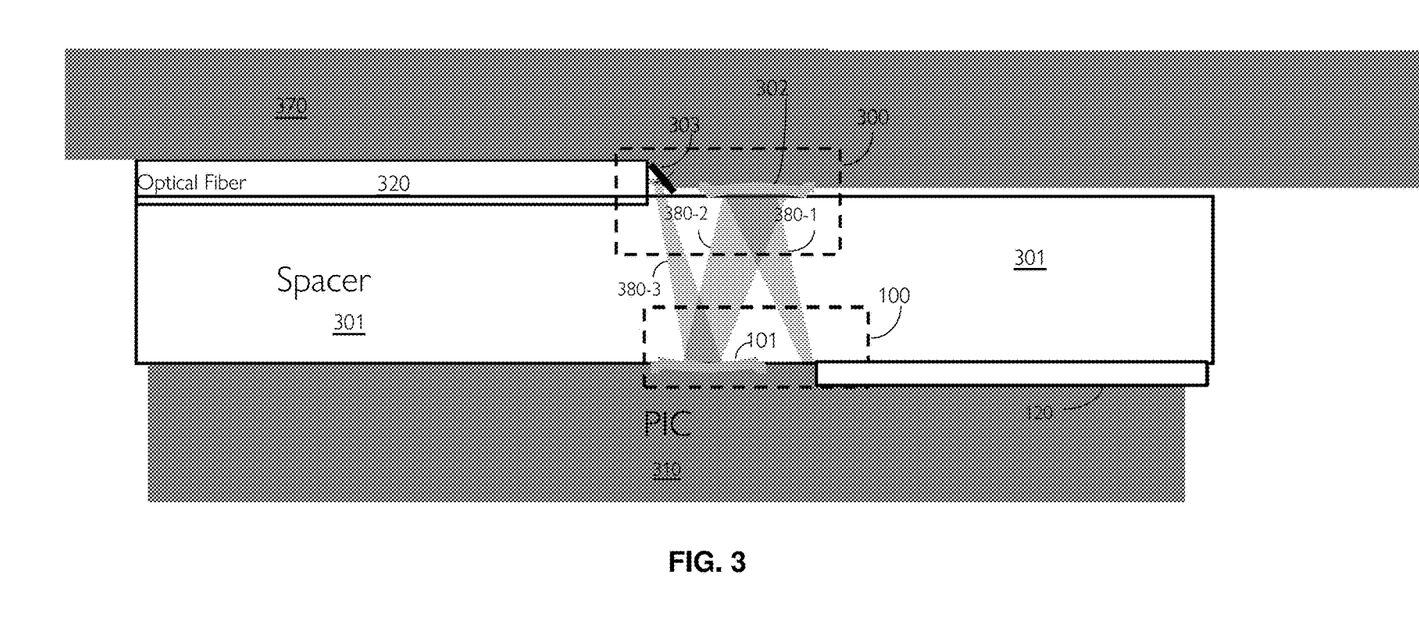
FIG. 3 is a schematic diagram showing a side view of a connection of a WBB to an optical fiber according to an embodiment.

FIG. 3 is a schematic diagram showing a side view of a connection of a WBB 100 to an optical fiber 320 according to an embodiment. The assembly shown in FIG. 3 includes a connection of the WBB 100 to a photonic plug 300.

The photonic plug 300 provides an optical connection between a PIC 310 and an optical fiber 320. In an embodiment, the photonic plug 300 includes a spacer 301 connected between the PIC 310 and the optical fiber 320, a curved mirror 302, and a tilted flat mirror 303. The photonic plug 300 may also include a fiber trench (not shown in FIG. 3).

The optical fiber 320 and the photonic plug 300 are stacked under a substrate layer 370. In an embodiment, the curved mirror 302 and the tilted flat mirror 303 are fabricated in the substrate 370. The substrate 370 may be comprised of the same or a different type of material as the substrate of the PIC 310. In an exemplary embodiment, the substrate layer 370 may be made of silicon dioxide ($SiO_2$), plastic, and the like. In another embodiment, the curved mirror 302 and a tilted flat mirror 303 are fabricated and incorporated in the spacer 301 and not in the substrate 370.

According to one embodiment, the material of the spacer 301 may be any transparent and non-conductive material, such as glass, polydimethylsiloxane, air, or any other index-matching materials. The structure of the photonic plug 300 is disclosed in greater detail in U.S. Pat. No. 9,804,334 assigned to the common assignee and incorporated herein by reference.

According to the disclosed embodiments, the WBB 100 is disposed on the PIC 310. When the spacer 301 is made out of a solid material, a cavity is formed in the spacer 301 to allow for placement of the photonic plug 300 therein.

In the arrangement shown in FIG. 3, a light beam 380-1 is deflected from the WBB 100. The source of the light beam 380-1 is the positive taper (101, FIG. 1). The curved mirror 302 reflects the light beam 380-1 into parallel light beams 380-2. The parallel light beams 380-2 reach the curved mirror (101, FIG. 1) of the WBB 100, which reflects a light beam 380-3 back to a tilted flat mirror 303. The flat mirror 303 directs the light beam 380-3 to the optical fiber 320. It should be noted that all light beams 380 travel through the spacer 301. It should be noted that the light can just as well travel in the opposite direction.

As the tilted flat mirror 303 is utilized to direct a light beam to an optical fiber 320 from the bump 100, this allows for placement of the optical fiber 320 parallel to the PIC 310.

It should be appreciated that the disclosed arrangement of the photonic plug 300 and WDM photonic bump 100 achieves high signal efficiency with a relaxed alignment between the PIC 310 and the optical fiber 320 due to the specific locations and shape of the curved mirrors in the bump and photonic plug placed against each other. The locations of such curved mirrors may be determined at least with respect to the source/drain of the light beam. In an embodiment, the curved mirrors are shaped in such a way that all light beams are reflected and collimated at a certain angle at a center of the curved mirror 302 and focused to a drain after the curved mirror in the WDM photonic bump 100.

It should be further noted that the photonic plug 300 and WBB 100 discussed with reference to FIG. 3 allows for a connection between a single fiber and the PIC 310. However, in a typical arrangement, a plurality of photonic plugs and bumps can be utilized to allow surface coupling of a plurality of optical fibers to the PIC 300.

The various optical couplers have been discussed herein with a reference to a specific embodiment with curved mirrors utilized for propagating light beams. However, the disclosed embodiments can be realized using other reflective or focusing elements, such as optical lenses, zone plates (e.g., Fresnel zone plates), and the like.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for use with a wideband photonic bump (WBB) including a positive taper of a polymer waveguide, a tilted flat mirror of the WBB, and a curved mirror of the WBB, the method comprising:

expanding, by the positive taper, a light beam received from an inverse taper of a photonic integrated circuit (PIC) to match a fiber optical mode of an optical fiber;

reflecting the light beam from the positive taper toward a curved mirror of a photonic plug formed on a surface of the photonic plug using the tilted flat mirror of the WBB; and directing, by the curved mirror of the WBB, a version of the reflected light beam received from the curved mirror of the photonic plug toward a tilted flat mirror of the photonic plug.

2. The method of claim 1, wherein the positive taper changes from a first height to a second height, wherein the first height is higher than the second height.

3. The method of claim 1, wherein the first height is about 10 microns and the second height is about 2 microns.

4. The method of claim 1, wherein the curved mirror of the WBB is formed on a surface of the WBB.

5. The method of claim 1, wherein the tilted flat mirror of the WBB is tilted at a predefined angle, wherein the predefined angle is determined based on an optical path between the optical fiber and the curved mirror of the photonic plug.

6. The method of claim 1, wherein the expanding converts the light beam from a small waveguide mode to a large optical fiber mode.

7. A wideband photonic bump (WBB) comprising:

a positive taper of a polymer waveguide adapted to be coupled to an inverse taper of a photonic integrated circuit (PIC);

a tilted flat mirror of the WBB; and a curved mirror of the WBB, wherein the positive taper of the polymer waveguide is adapted to expand a light beam received from the inverse taper at a location at which the positive taper is coupled to the inverse taper to match a fiber optical mode of an optical fiber, and is adapted to contract the optical mode of a light beam received from the optical fiber to match the optical mode of the inverse taper at the location at which the positive taper is coupled to the inverse taper, wherein the tilted flat mirror of the WBB reflects light exiting the positive taper toward a curved mirror of a photonic plug, and reflects light from the curved mirror of the photonic plug toward the positive taper for entry thereto, and wherein the curved mirror of the WBB reflects a version of the light reflected by the tilted flat mirror of the WBB that is received from the curved mirror of the photonic plug, toward a tilted flat mirror of the photonic plug, and reflects light received from the tilted flat mirror of the photonic plug toward the curved mirror of the photonic plug.

8. The WBB of claim 7, wherein at least one of the curved mirror of the WBB or the tilted flat mirror of the WBB is coated with a dielectric that reflects at least a specified wavelength of light.

9. The WBB of claim 7, wherein at least one of the tilted flat mirror of the WBB or the curved mirror of the WBB is formed using at least a nanoimprint lithography process.

10. A method for use in coupling an optical fiber to a photonic integrated circuit (PIC) using a photonic plug including a tilted flat mirror of the photonic plug, a curved mirror of the photonic plug, and a spacer, the method comprising:

reflecting by the tilted flat mirror of the photonic plug toward a curved mirror of a wideband photonic bump (WBB), the WBB being coupled to a negative taper of the PIC, light received from the optical fiber; and
reflecting, by the curved mirror of the photonic plug toward a tilted flat mirror of the WBB, light received from the curved mirror of the WBB,
wherein light going between the photonic plug and the WBB passes through the spacer, which is substantially transparent thereto.

11. The method of claim 10, wherein at least one of the curved mirror of the photonic plug or the tilted flat mirror of the photonic plug is coated with a dielectric that reflects at least a specified wavelength of light.

12. A photonic plug, comprising:
a tilted flat mirror of the photonic plug;
a curved mirror of the photonic plug; and
a spacer of the photonic,
wherein the tilted flat mirror of the photonic plug is adapted to couple light between an optical fiber and a curved mirror of a wideband photonic bump (WBB), the WBB being coupled to a negative taper of a photonic integrated circuit (PIC),
wherein the curved mirror of the photonic plug is adapted to couple light between the curved mirror of the WBB and a tilted flat mirror of the WBB, and
wherein light going between the photonic plug and the WBB passes through the spacer, which is substantially transparent to a wavelength thereof.

13. The photonic plug of claim 12, wherein the curved mirror of the photonic plug and the tilted flat mirror of the photonic plug are in the spacer.

14. The photonic plug of claim 12, wherein the optical fiber and the photonic plug are stacked under a substrate layer.

15. The photonic plug of claim 14, wherein the curved mirror of the photonic plug and the tilted flat mirror of the photonic plug are formed on the substrate layer.

16. The photonic plug of claim 12, wherein the tilted flat mirror of the photonic plug is formed so as to be tilted at a predefined angle, wherein the predefined angle is determined based on an expected optical path between the optical fiber and the curved mirror of the WBB.

17. An apparatus comprising:
an optical waveguide having a tapered portion comprising:
a first cross-section in a first dimension having a substantially trapezoidal configuration; and
a second cross-section in a second dimension, substantially perpendicular to the dimension, having a second substantially trapezoidal configuration;
a substantially flat mirror configured to interface an optical signal with the optical waveguide; and
a curved mirror configured to facilitate an optical connection of the optical waveguide to an optical fiber.

18. The apparatus of claim 17, wherein the substantially flat mirror is disposed proximate to the optical waveguide and angled with respect to a bottom side of the optical waveguide.

19. The apparatus of claim 17, wherein the tapered portion of the optical waveguide is configured to transform a mode diameter of the optical signal by being configured to, at least one of:
expand the mode diameter of the optical signal, or contract the mode diameter of the optical signal.

20. The apparatus of claim 17, wherein the substantially flat mirror is configured to interface the optical signal with the optical waveguide by being configured to:
receive, the optical signal; and
substantially reflect, substantially into the optical waveguide, the received optical signal.

21. The apparatus of claim 17, wherein the curved mirror defines a first curved mirror and is configured to facilitate an optical connection of the optical waveguide to the optical fiber by being configured to:
receive the optical signal,
wherein the optical signal enters the apparatus from the optical fiber;
substantially collimate the optical signal; and
substantially reflect the optical signal to a second curved mirror facing a direction substantially opposed to the first curved mirror,
wherein the second curved mirror substantially focuses the optical signal and substantially reflects the optical signal to the substantially flat mirror.

22. The apparatus of claim 17, wherein the curved mirror defines a first curved mirror and is configured to facilitate an optical connection of the optical waveguide to an optical fiber by being configured to:
receive the optical signal from a second curved mirror facing a direction substantially opposed to the first curved mirror,
wherein the second curved mirror is configured to substantially reflects the optical signal from the substantially flat mirror to the first curved mirror;
substantially focus the optical signal; and
substantially reflect the optical signal toward the optical fiber.

23. The apparatus of claim 22, wherein the substantially flat mirror defines a first substantially flat mirror and wherein the first substantially flat mirror is configured to substantially reflect the optical signal toward the optical fiber by being configured to:
substantially reflect the optical signal toward a second substantially flat mirror proximate to the optical fiber,
wherein the second substantially flat mirror interfaces the optical signal with the optical fiber.

24. A method comprising:
transforming, by a tapered portion of an optical waveguide, a mode diameter of an optical signal,
wherein the tapered portion of the optical waveguide is tapered in two planes;
interfacing, by a substantially flat mirror, the optical signal with the optical waveguide;
receiving, by a curved mirror, the optical signal; and
substantially reflecting, by the curved mirror, the optical signal.

25. The method of claim 24, further comprising, by the curved mirror, at least one of:
collimating the optical signal, or
focusing the optical signal, and
combinations thereof.

26. The method of claim 24, wherein the interfacing comprises:
relaying the optical signal, by the substantially flat mirror, at least one of:
to the optical waveguide, or
from the optical waveguide, and
combinations thereof.

27. The method of claim 24, wherein the transforming comprises expanding the mode diameter of the optical signal to substantially match a mode diameter of an optical fiber.

28. An apparatus comprising:
an optical waveguide configured to interface an optical signal with a photonic integrated circuit (PIC);

a first substantially flat mirror configured to optically connect the optical signal between the optical waveguide and a first curved mirror; and a second curved mirror facing a direction substantially opposed to the first curved mirror and configured to optically connect the optical signal between the first curved mirror and a transmitter of the PIC.

* * * * *